Feb. 20, 1945.   C. A. NERACHER ET AL   2,369,842
SYNCHROMESH TRANSMISSION
Filed May 27, 1943
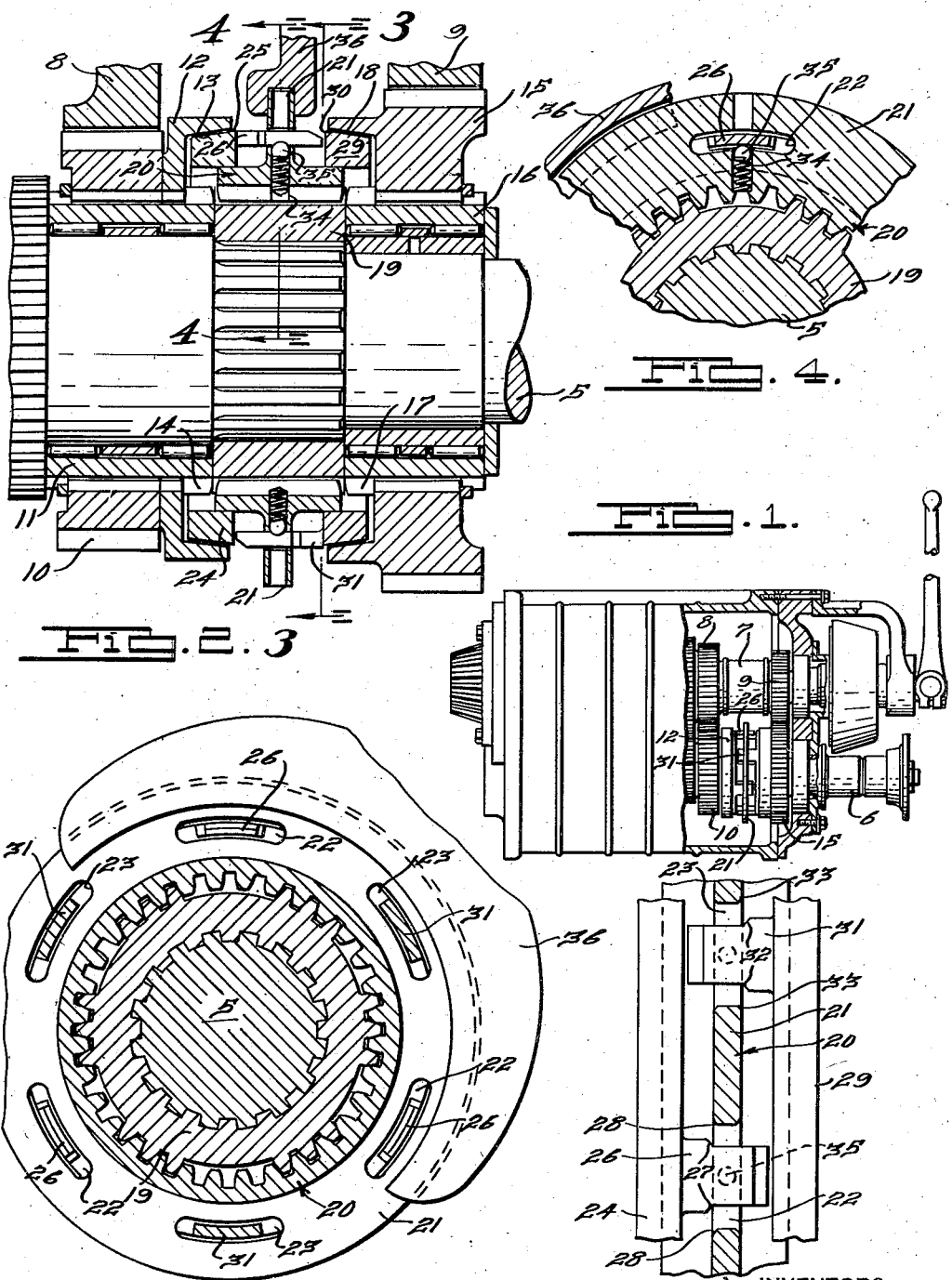
INVENTORS
Carl H. Neracher
BY William T. Dunn
Harness, Dickey, Pierce & Harris
ATTORNEYS Patented Feb. 20, 1945

2,369,842

UNITED STATES PATENT OFFICE 2,369,842

SYNCHROMESH TRANSMISSION

Carl A. Neracher and William T. Dunn, Detroit, Mich., assignors to Chrysler Corporation, Highland Park, Mich., a corporation of Delaware Application May 27, 1943, Serial No. 488,687

5 Claims. (Cl. 192—53)

This invention relates to change speed transmissions and more particularly to improvements in synchromesh mechanisms for use therein.

An object of the invention is the provision of improvements in synchronous clutch mechanisms for blocking clutching action when the parts to be clutched are operating at different speeds and which will accommodate clutching when the parts are operating at approximately the same speed; and to provide a mechanism adapted to effect approximate synchronization of the parts to be clutched prior to the clutching engagement.

Another object of the invention is the provision of a synchronous clutch mechanism of improved dual synchronous control members and an improved arrangement for insuring energization thereof.

Other objects of the invention will be more apparent from the following description taken in connection with the accompanying drawing, in which:

Fig. 1 is a side elevational view, partly in section, of a change speed power transmission embodying the invention.

Fig. 2 is an enlarged transverse section taken as indicated by the line 2—2 of Fig. 1.

Fig. 3 is a sectional side elevational view taken on the line 3—3 of Fig. 2.

Fig. 4 is a fragmentary sectional view in side elevation taken as indicated by the line 4—4 of Fig. 2.

Fig. 5 is a fragmentary top plan view, partly in section, illustrating the blocker-synchronizer control members and their connection with the clutching sleeve.

Referring to the drawing, the invention is illustrated in conjunction with a power transmission of the type having a plurality of speed ratio drives. The transmission illustrated in Fig. 1 includes an input shaft 6 adapted to be driven by a power unit preferably through the medium of a clutch, not shown, and an output shaft 7 having a plurality of driven gears coaxial therewith, including the gears 8 and 9 rotatable therewith and of relatively different diameters. The gear 8 is in constant mesh with a gear 10 having a splined connection with a sleeve 11 rotatably mounted on the shaft 5 as shown in Fig. 2. Splined to the sleeve 11 is an annulus 12 having an internal friction face 13. A set of clutch teeth 14 is formed on the external periphery of the sleeve 11 for rotation with the gear 10 and annulus 11. The gear 9 is in constant mesh with a gear 15 having a splined connection with a sleeve 16 rotatably journaled on the shaft 5 and having a set of clutch teeth 17. The member 15 has an internal friction face 18 which, together with the friction face 13, is in the form of a portion of a cone. The gears 10 and 15 and the sleeves 11 and 16 are axially stationary with respect to the shaft 5.

An axially stationary hub 19 is splined on the shaft 5 between the sleeves 11 and 16 and has external splined teeth mated with splined teeth on the inner periphery of a sleeve 20, adapted for axial shift to selectively clutch with the teeth 14 and 17. Formed on the outer periphery of the sleeve 20 is an annular flange 21 having a first set of three circumferentially elongated openings 22 and a second set of three circumferentially elongated openings 23 arranged alternately with respect to the openings of the set 22.

Shift of the sleeve 20 to clutch with the teeth 14 is under control of an annular blocker member 24 having a friction face 25 in the form of a portion of a cone registering with and adapted to engage the friction face 13. The blocker member 24 has three axially extending projections 26 respectively disclosed in the openings 22 with clearance therebetween to accommodate relative rotation of the blocker and sleeve. Each projection 26 has a pair of ramp-like shoulders 27 as shown more particularly in Fig. 5 which are respectively adapted to cooperate with ramp-like walls 28 of the associated openings 22 for the purposes hereinafter set forth.

Shift of the sleeve 20 to clutch with the teeth 17 is under control of a blocker member 29 having a friction face 30 in the form of a portion of a cone registering with and adapted to engage the friction face 18 of the gear 15, the member 29 carrying three axially extending tongues 31 respectively disposed in the openings 23 with clearance therewith to accommodate relative rotation of the sleeve 20 and blocker 29. Each tongue has a pair of ramp-like shoulders 32 respectively adapted to cooperate with the ramp-like wall portion 33 at the opposite end of the slots 23 for the purposes hereinafter set forth.

The sleeve 20 is provided with a plurality of circumferentially spaced, radially extending bores 34 respectively registering with the slots 22, 23, each bore containing a spring-pressed detent 35 frictionally engaging the tongue of the associated bore, each projection preferably being provided with a relatively shallow indented seat receiving the associated detent when the mechanism is in the illustrated position. Selective shift of the sleeve 20 is had through the medium of a shift with the hub and shiftable axially relative thereto to selectively clutch with said sets of clutch teeth, said sleeve section including a plurality of spaced openings therein, an axially shiftable blocker member associated with each of said structures and having a projection disposed in one of said sleeve section openings accommodating rotary movement of the blocker member relative to the sleeve section for blocking and allowing said clutching shift, each blocker member having a friction face engageable with the friction face of the structure associated therewith in response to axial shift of the blocker member for effecting said movement of the latter, and a releasable connection between said sleeve section and said projections for shifting said members with said sleeve section.

5. In a power transmitting mechanism, relatively rotatable structures each having a set of clutch teeth and a friction face, a shiftable toothed body intermediate said sets of clutch teeth shiftable to selectively clutch therewith and including a radially outwardly extending flange having openings therein, a blocker member associated with each of said structures having a projection disposed in one of said openings establishing a driving connection for the blocker with said toothed body accommodating rotation of the projection relative to said toothed body between a first position engageable with said flange to block said clutching shift and a second position accommodating the latter, each blocker member having a friction face engageable with the friction face of the structure associated therewith for rotating the blocker projection to its blocking position incident to relative rotation of the toothed body and the structure to be clutched, and a connection between each of said blocker members and said toothed body operable to engage as aforesaid the friction faces of the associated blocker member and structure as an incident to shift of the toothed body to clutch with the teeth of the last mentioned structure.

CARL A. NERACHER.
WILLIAM T. DUNN.